(12) United States Patent
Koch et al.

(10) Patent No.: US 6,595,502 B2
(45) Date of Patent: Jul. 22, 2003

(54) BUMPER SYSTEM FOR VEHICLES

(75) Inventors: Boris Koch, Wermelkirchen (DE); Roland Brambrink, Ratingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/032,529

(22) Filed: Oct. 25, 2001

(65) Prior Publication Data
US 2002/0101086 A1 Aug. 1, 2002

(30) Foreign Application Priority Data
Oct. 30, 2000 (DE) .......................... 100 53 840

(51) Int. Cl.[7] ................................. F16M 1/00
(52) U.S. Cl. .................. 267/139; 267/116; 188/377; 293/133; 296/189; 256/13.1
(58) Field of Search ................ 267/139, 140, 267/116, 122; 188/377, 376, 371; 293/133; 296/189; 256/13.1, 1; 404/6, 10

(56) References Cited

U.S. PATENT DOCUMENTS

| | | | |
|---|---|---|---|
| 3,495,474 A | | 2/1970 | Nnishimura et al. .......... 74/492 |
| 3,759,351 A | | 9/1973 | Purple ........................ 188/1 C |
| 3,811,698 A | * | 5/1974 | Glance ........................ 280/784 |
| 3,831,997 A | * | 8/1974 | Myers ........................ 296/189 |
| 3,869,017 A | * | 3/1975 | Feustel et al. ............... 180/232 |
| 3,938,841 A | * | 2/1976 | Glance et al. .............. 267/116 |
| 4,047,701 A | * | 9/1977 | Glaesener .................. 256/13.1 |
| 4,366,885 A | * | 1/1983 | Vrijburg ..................... 188/377 |
| 4,410,208 A | | 10/1983 | Mulso, Jr. et al. .......... 293/132 |
| 4,877,224 A | * | 10/1989 | Watts ......................... 267/140 |
| 5,190,803 A | | 3/1993 | Goldbach et al. ........... 428/138 |
| 5,842,265 A | | 12/1998 | Rink ........................... 29/460 |
| 5,940,949 A | | 8/1999 | Rink .......................... 29/33 K |
| 6,082,792 A | * | 7/2000 | Evans et al. ................ 293/133 |
| 6,199,937 B1 | * | 3/2001 | Zetouna et al. ............. 296/136 |

FOREIGN PATENT DOCUMENTS

| | | |
|---|---|---|
| DE | 42 09 826 A 1 | 9/1993 |
| DE | 298 23 980 U 1 | 3/2000 |
| EP | 0 995 668 | 4/2000 |
| FR | 2 706 961 | 12/1994 |
| JP | 2000052897 A * | 2/2000 |

* cited by examiner

Primary Examiner—Matthew C. Graham
Assistant Examiner—Mariano Sy
(74) Attorney, Agent, or Firm—Joseph C. Gil; James R. Franks

(57) ABSTRACT

An energy absorbing element, that may be used with, for example, vehicles such as automobiles and trucks, is described. The energy absorbing element (2, 2') comprises, (a) at least two oppositely arranged metal sheets (7, 8) having a multiplicity of predetermined buckling points (11, 12 and 13) which enable each sheet (7, 8) to fold up along its longitudinal direction (x-direction); and (b) a plurality of connecting ribs (9) which interconnect the oppositely arranged metal sheets (7, 8), the connecting ribs (9) being fabricated from a plastic material selected from thermoplastic materials and/or thermosetting plastic materials. Also described is a bumper system which comprises a transverse beam and at least one of the energy absorbing elements of the present invention.

13 Claims, 4 Drawing Sheets

BUMPER SYSTEM FOR VEHICLES

CROSS REFERENCE TO RELATED PATENT APPLICATION

The present patent application claims the right of priority under 35 U.S.C. §119 (a)–(d) of German Patent application No. 100 53 840.1, filed Oct. 30, 2000.

FIELD OF THE INVENTION

The invention relates to an energy absorbing element and to a bumper system for vehicles that includes the energy absorbing element, which serves for the transmission and absorption of kinetic energy released, for example, in the event of motor vehicle accidents. The energy absorbing element is particularly suitable in vehicle bumper systems, but may equally serve as part of another vehicle structure and other safety elements, having a comparable requirement profile.

BACKGROUND OF THE INVENTION

Energy-transmitting and energy-converting systems, particularly or use in the area of vehicle bumpers, are known and are successfully employed. Bumper systems which survive minor accidents (at an impact speed of up to about 8 km/h) without damage owing to energy-absorbing elements are widespread. In order to achieve favorable risk ratings with vehicle insurers, shock-absorbing systems which can be loaded significantly above a crash speed of 10 km/h are sought by many vehicles manufacturers. In the USA, bumper systems with a damage-free crash speed of up to 8 km/h are generally employed. If the energy introduced into the system is even greater, for example in the Allianz Zentrum für Technik (Central Alliance for Technology—AZT) crash test at a speed of 15 km/h, the energy is absorbed by special energy absorbing elements.

As a general rule, the installation space available for the known systems mentioned is very small. The high kinetic energy to be converted in a damage event requires a high efficiency of the system, i.e., an energy absorbing element with force-deformation characteristics as ideal as possible. This ideal characteristic is notable for the fact that, after an initially steep rise in force while the energy absorption progresses in time, a horizontal plateau with a constant force occurs. The energy absorbed here is defined as the area below the force-displacement curve and this area should be as large as possible.

In energy absorption, a distinction can be made between so-called reversible and non-reversible systems. Examples of reversible systems which may be mentioned are those with hydraulic dampers (e.g., gas-filled springs). These systems are very efficient and convert the energy of an impact efficiently. The disadvantage of the hydraulic damping systems is their complex and typically very costly production, which prevents these systems from being used widespread.

Examples of non-reversible systems include support systems made of steel or aluminum with plastically deformable steel or aluminum elements for energy absorption. For relatively low energies to be converted, quasi-reversible systems may be employed (e.g., foam blocks made of energy absorption (EA) foam or aluminum foam). If a great energy is to be absorbed, deformable sheet-metal profiles are generally employed.

Apart from pure energy conversion, the absorption systems typically must fulfill other requirements. Independence from climate and weather influences, high reproducibility of the energy conversion, ease of maintenance on replacing the systems and tolerance compensation on mounting are also important requirements.

SUMMARY OF THE INVENTION

The object on which the invention is based is to develop an energy transmission and absorption system which converts the kinetic energy (for the most part into heat) from moving vehicle masses in the smallest possible space by means of the plastic deformation of a material or element. This system should be easy to handle and, particularly when fitted to a vehicle, should enable positioning (e.g., tolerance compensation) in all three spatial directions (i.e., the x, y and z spatial directions). Furthermore, it should exhibit substantially reproducible behavior over its entire period of use, be cost-effectively producible and be lightweight.

Apart from pure energy conversion, the system is to be capable of distributing the forces, e.g., from an impact, to the adjoining structures. The system should also stabilize the body or frame structure of vehicle during an impact event.

An energy absorption element which fulfills the above-mentioned requirements with regard to ease of fabrication, lightness and energy absorption behavior has been found. Specifically, a bumper system has been developed which, owing to the particular arrangement of a transverse beam and energy absorption elements (and the special shape of the latter), is capable of absorbing the energy of an impact with very high efficiency over a preset deformation distance. In particular, owing to the lateral arrangement of energy absorbing elements with respect to the transverse beam, this system provides a much greater distance for energy conversion than conventional systems with an energy absorbing element arranged behind a transverse beam.

In accordance with the present invention, there is provided an energy absorbing element (2, 2') comprising:
  (a) at least two oppositely arranged metal sheets (7, 8) having a multiplicity of predetermined buckling points (11, 12 and 13) which enable each sheet to fold up along its longitudinal direction (e.g., in the x-direction); and
  (b) a plurality of connecting ribs (9) which interconnect said oppositely arranged metal sheets (7, 8), said connecting ribs (9) comprising a plastic material selected from at least one of thermoplastic material and thermosetting plastic material.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Other than in the examples, or where otherwise indicated, all numbers or expressions, such a those expressing structural dimensions, etc, used in the specification and claims are to be under stood as modified in all instances by the term "about."

BRIEF DESCRIPTION OF THE DRAWING FIGURES

DETAILED DESCRIPTION OF THE INVENTION

Figure 1:
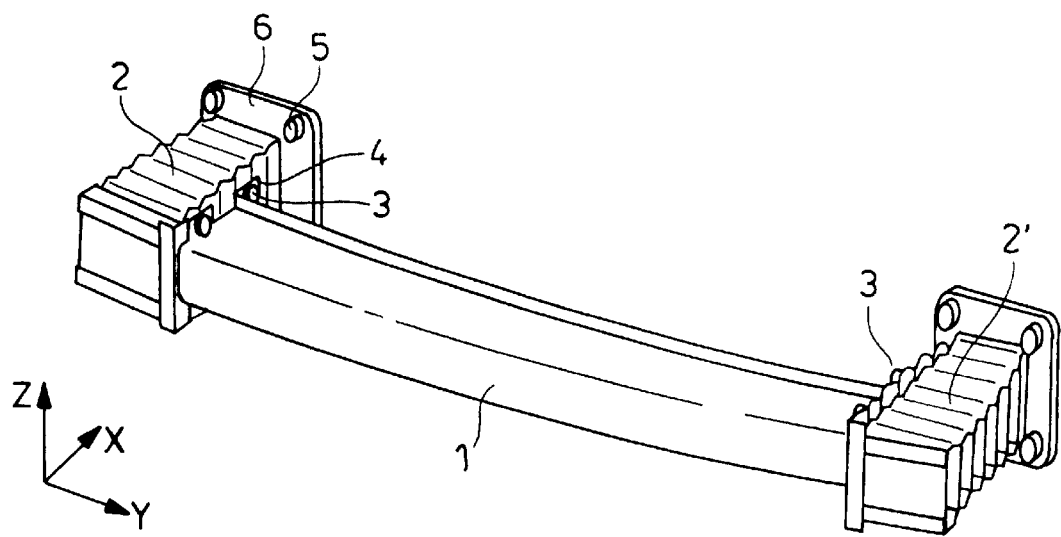
FIG. 1 represents a perspective view of a bumper system according to the present invention.

The ribs preferably consist of a thermoplastic material. The thermoplastic material may be selected from at least one of thermoplastic polyamide, thermoplastic polypropylene, thermoplastic polyester. The ribs are preferably formed by injection molding plastic material, e.g., thermoplastic material, onto the opposed metal sheets. In an embodiment of the present invention, in the course of injection molding the plastic material onto the opposed metal sheets, the ribs formed thereby are attached to the opposed metal sheets by means of concurrently formed anchor points, as will be discussed in further detail herein.

The plastic material of the ribs may comprise one or more reinforcing materials in an embodiment of the present invention. The reinforcing material is typically present in a reinforcing amount, i.e., an amount that is sufficient to result in a reinforced molded article. Reinforcing materials include those known to the skilled artisan, e.g., glass fibers, metal fibers, carbon fibers, glass beads and combinations thereof. In a preferred embodiment of the present invention, the plastic material of the ribs comprises a reinforcing amount of glass fibers.

In an embodiment of the present invention, the ribs are attached to the opposed metal sheets by means of discrete anchoring points selected from molded-through features, e.g., molded-through buttons, molded nubs, molded-around features and combinations thereof. In a preferred embodiment, the ribs are formed by injection molding plastic material onto the metal sheets, and the metal sheets have edges and a plurality of at least one of depressions (e.g., dimples) and apertures (or perforations) having edges. The anchoring points are preferably formed concurrently with the injection molding of the ribs by at least one of the following methods (i), (ii) and (iii). In method (i), the injected-on plastic material of the ribs passes through at least some of the apertures in the sheets, and the edges of the apertures become embedded in the plastic material extending therethrough, thereby anchoring the connecting ribs to the metal sheets by means of molded-through features. With method (ii) the injected-on plastic material of the ribs fills at least some of the depressions in the metal sheets, thereby anchoring the connecting ribs to the metal sheets by means of molded nubs. In method (iii), the injected-on plastic material of the ribs encases and embeds at least a portion of the edges of the metal sheets, thereby anchoring the connecting ribs to the metal sheets by means of molded-around features.

The mechanical stability of the energy absorbing element transversely with respect to the direction of the energy absorption is increased by means of the molded-on anchoring points.

The buckling points of the metal sheets are formed particularly preferably by undulating, trapezoidal and/or sawtooth profiling of the metal sheets. Such profiling methods are performed in accordance with art recognized methods.

The transverse stability of the energy absorbing element can be increased in a preferred form by the fact that the ribs interconnect opposite buckling points of the metal sheets.

Particular preference is given to an energy absorbing element in which the ribs interconnect respectively opposite depressions or elevations in the metal sheets. In this case, the metal sheets are positioned with respect to one another such that the depressions on one sheet are opposite the depressions on the other sheet, the elevations of each sheet are accordingly opposed one from the other.

A further preferred variant of the energy absorbing element is characterized in that the ribs have additional flange webs at the points of connection to the metal sheets (i.e., the anchoring points). The flange webs are preferably utilized in conjunction with the molded-through features.

To simplify mounting, in a preferred further embodiment, the energy absorbing element is connected, at one end of the energy absorbing element, to a base plate. The base plate is arranged, for example, transversely with respect to the x-direction and has bores for mounting on vehicle parts, e.g., the front and/or rear of an automobile.

A further subject of the invention is a bumper system for vehicles which includes at least one energy absorbing element according to the present invention.

Preference is given to a bumper system for vehicles in which the bumper system comprises at least one transverse beam and at least one energy absorbing element attached to each of the two ends of the transverse beam.

In a preferred design of the bumper system, the transverse beam is detachably laterally fastened to the energy absorbing elements.

The fastening of the energy absorbing elements is effected in particular by means of flanged connections on the transverse beam. The flanges on the transverse beam have elongated holes whose main orientation is in the x-direction, i.e., in the direction of the force absorption of the energy absorbing element.

The energy absorbing element comprises two oppositely arranged metal sheets having a multiplicity of predetermined buckling (or bending) points which enable the sheets to fold along their longitudinal direction (x-direction). The metal sheets can be configured, as described, in an undulating, trapezoidal and/or sawtooth shape or form.

Connecting ribs made, in particular, of thermoplastic and/or thermosetting plastic form the connection between the mutually opposite metal sheets. The connection of the plastic ribbing to the metal sheet is realized, for example, as a positive connection. In this case, the ribs are connected to the sheets at discrete anchoring points, in particular by nubs, apertures (molded-through features) or by molded-around features at the edges of the metal sheets, as described previously herein.

The arrangement of the ribs is characterized in particular in that each rib connects respectively opposite depressions or elevations in the metal sheets. For additional support and stabilization of the energy absorption element, the plastic ribs can have additional flange webs. These webs form a frictional connection between metal sheets and plastic ribs.

The mutually opposite sheets of the energy absorbing element can be fastened (e.g., by means of welding) to a base plate. The base plate serves to join the energy absorbing element to a structure located therebehind (e.g., the longitudinal beam of a vehicle).

The two main parts of the bumper system, i.e., the energy absorbing elements and the transverse beam, are frictionally and/or positively interconnected preferably in such a way that the connection can be repeatedly separated and re-established. This special form of the connection is realized by means of screws and elongated holes in a flange on the transverse beam, in order to allow dimensional adjustment of the transverse beam in the x-direction. The adjustability in the y- and z-direction is effected, for example, by oversize bores in the base plate of the energy absorption element.

Owing to the novel arrangement of transverse beam and energy absorption elements, the system can be positioned on the vehicle in all three spatial directions without additional elements and is therefore a very cost-effective system.

Significant advantages over the prior art have been achieved in terms of energy transmission and absorption with the energy absorbing element of the present invention.

The energy absorption efficiency of with the energy absorbing element is very high owing to the ability to influence the buckling process in a specific manner. In contrast to existing metal crash boxes in which, for example, the number and size of the folds formed is very difficult to control and influence, the structure of the energy absorption element according to the invention allows the precise number of folds to be defined. For this reason, the energy absorption or the force-deformation characteristic of the energy absorbing element has very good reproducibility. By graduating the undulating structure, the force-deformation characteristic can also be made progressive and/or degressive, which was not possible with conventional elements. Owing to their connection to the metal sheets, the plastic ribs dictate the type of deformation that the metal will undergo in the event of an impact. The production of the energy absorption elements and thus the connection between sheet and plastic ribs is realized cost-effectively and simply by the plastic injection molding process. Additional mounting steps for the individual parts is avoided. In the course of the injection molding process, other components can also be integrated into the bumper system. Add-on parts in the immediate vicinity can be positioned or fastened in a dimensionally accurate manner.

The plastic-metal connections (also referred to as hybrid technology) are realized, for example, in such a way that the metal structure is placed in a plastic injection mold and the plastic melt is injected into the closed mold. The sheet element can be protected against corrosion by painting, phosphatising, galvanizing, etc. Especially suitable plastics are, in particular, include thermoplastics such as PA 6, PA 66, PBT or PA 6 GF, PA 66 GF, PBT GF, etc. or other plastics such as thermosets, e.g., thermosetting polyurethanes. Owing to the manufacture of the system by the plastic injection molding process, a high reproducibility in the production is achieved.

The connection of the energy absorption elements and the transverse beam allows an adjustability of the system in the x-direction and, owing to the base plate of the energy absorption element, also a y,z-adjustability. The variable positioning in all three spatial directions is generally only possible in conventional systems by means of additional elements.

Since mounting space is typically very limited in today's passenger cars, only the interspace between longitudinal-beam flange and transverse beam can be utilized for an energy absorbing system in conventional systems. The special lateral arrangement of the energy absorbing elements according to the present invention creates additional distance for the energy conversion, since the depth (or x-extent) of the transverse beam can also be utilized for the energy conversion.

The invention is explained in more detail below by the examples with reference to the drawing figures, without however the invention being limited to the details thereof.

EXAMPLES

Example 1

FIG. 1 shows the perspective view of the bumper system. The latter comprises a transverse beam 1 and two energy absorption elements 2, 2' attached to the ends of the transverse beam 1. Each energy absorption element 2, 2' comprises two oppositely arranged metal sheets 7, 8 having a multiplicity of predetermined bending points 11. The metal sheets 7, 8 are configured in a sawtooth shape. The bending points 11 described enable the structure of the energy absorption elements 2, 2' to fold in a very defined manner in the longitudinal direction (x-direction) after exceeding a given critical load. Located at the two ends of the transverse beam 1 are shaped flanges 3 having elongated holes 4. There, the two energy absorbing elements 2, 2' are each screwed on in such a way that the transverse beam 1 can be ideally positioned in the x-direction. Dimensional tolerances in longitudinal directions of the vehicle can thus be compensated without additional distance plates.

Example 2

Figure 2:
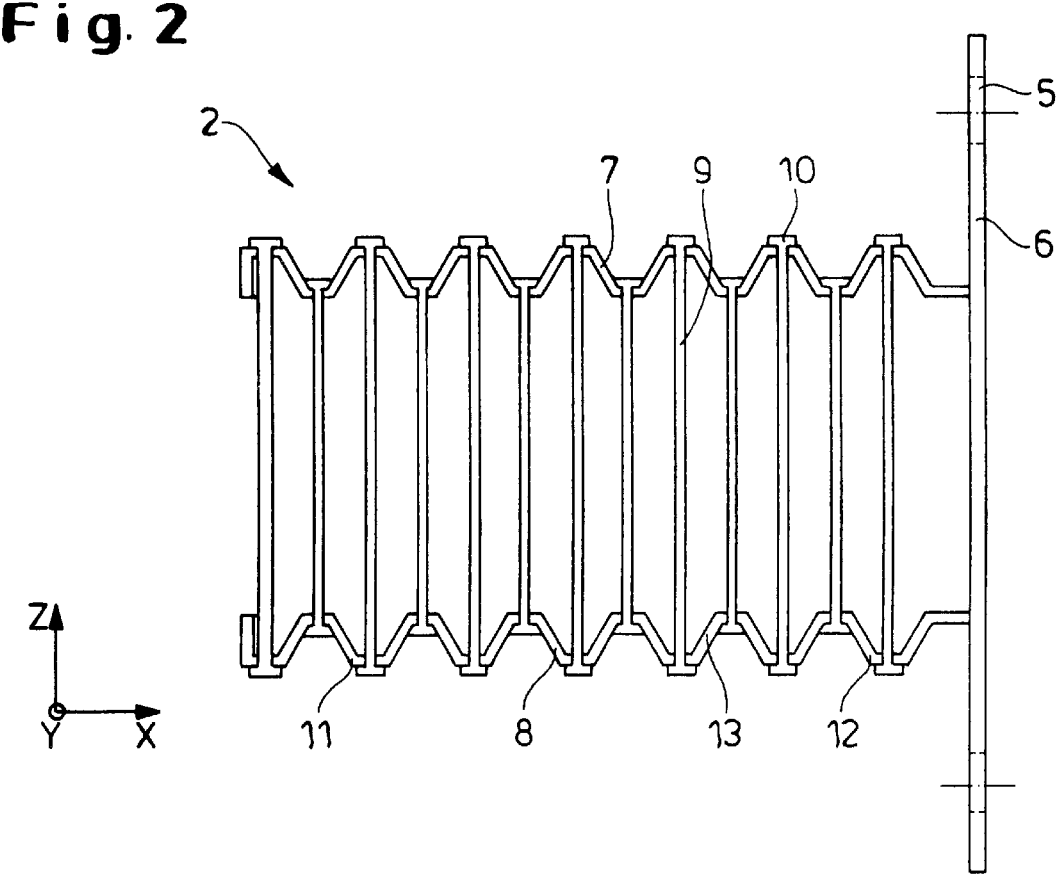
FIG. 2 is a sectional representation of an energy absorbing element according to the present invention.

FIG. 2 shows a longitudinal section through an energy absorbing element 2. The connecting ribs 9 consists of thermoplastic (glass fiber-reinforced polyamide 6) and form the connection between the mutually opposite metal sheets 7, 8. The connection of the plastic ribs 9 to the metal sheet 7 and 8 is realized as a positive connection. In this case, the ribs 9 are particularly connected to the sheets 7, 8 at discrete anchoring points 10 in the metal sheets 7, 8. The metal sheets have holes 16 at the desired anchoring points 10. Since the entire energy absorbing element 2 and 2' is produced in one operation by the plastic injection molding process, the plastic melt can penetrate through the holes 16 of the metal sheet 7 and 8 and create there a button- or rivet-like connection between plastic ribs 9 and the metal sheets 7 and 8. The mutually opposite sheets 7 and 8 of the energy absorption element 2 are fastened to a base plate 6 by welding. The base plate 6 has fastening bores 5 and serves to join the energy absorption element 2 to a structure located therebehind (in the vehicle this is the longitudinal beam for example).

Figure 3A:
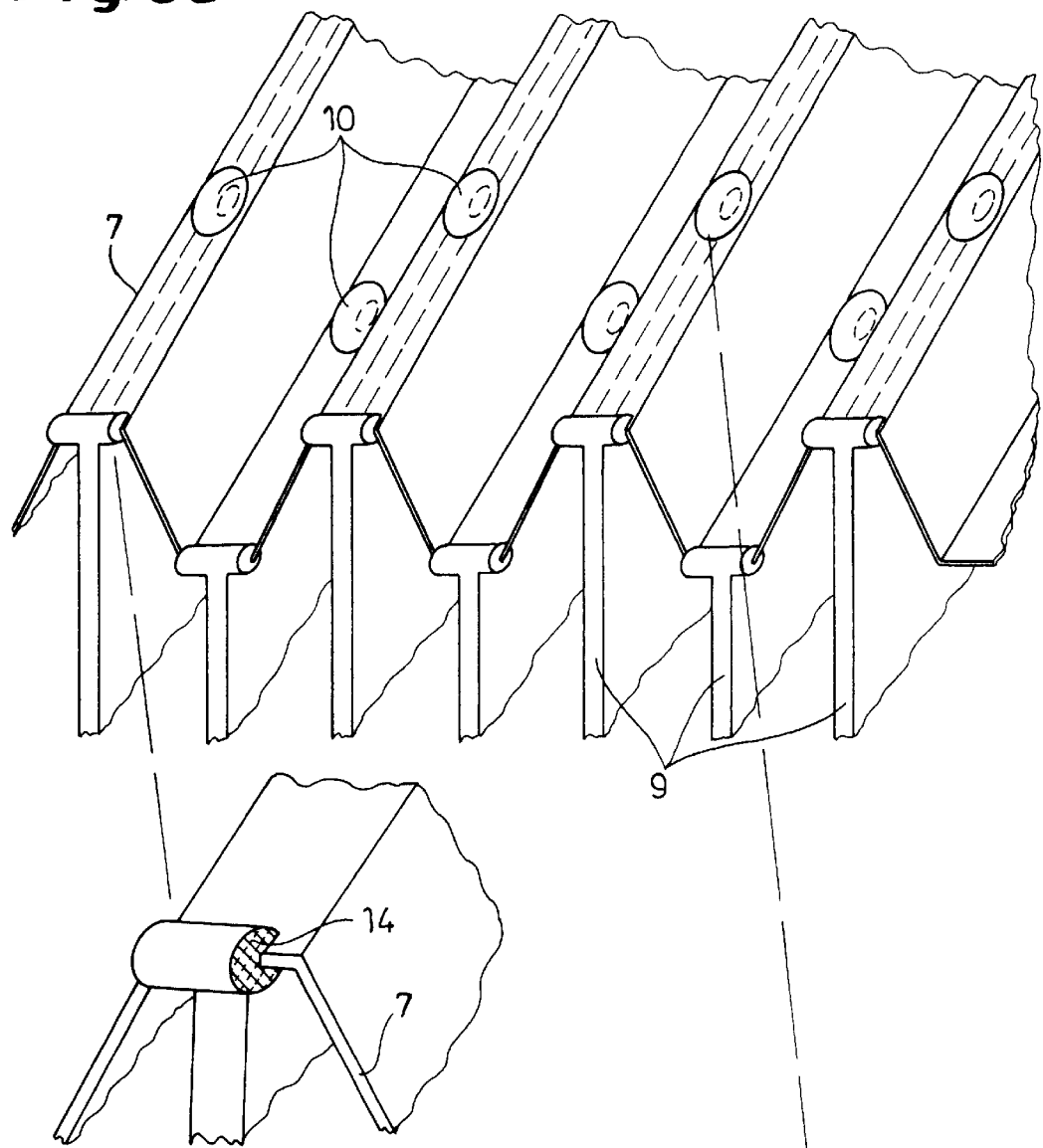
FIGS. 3a and 3b represent sectional and perspective views of anchoring points by which the ribs are connected to the metal sheets of the energy absorbing element according to the present invention.
Figure 3B:
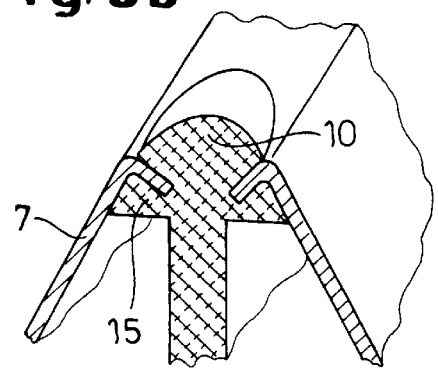

Different ways of connecting plastic ribs 9 to the metal sheet 7 and 8 can be seen FIG. 3a. Located at the upper edge of the metal sheet 7 shown here is a cross-sectionally circular molded-around feature 14 on the sheet 7, whereas in the lower floor of the sheet there is located a molded-through feature which is filled in by the plastic melt. This molded-through feature can be compared with a riveted joint. The lower picture in FIG. 3b shows a possible means of supporting the plastic ribs 9 on the metal sheet 7, 8 by so-called flange webs 15.

Figure 4A:
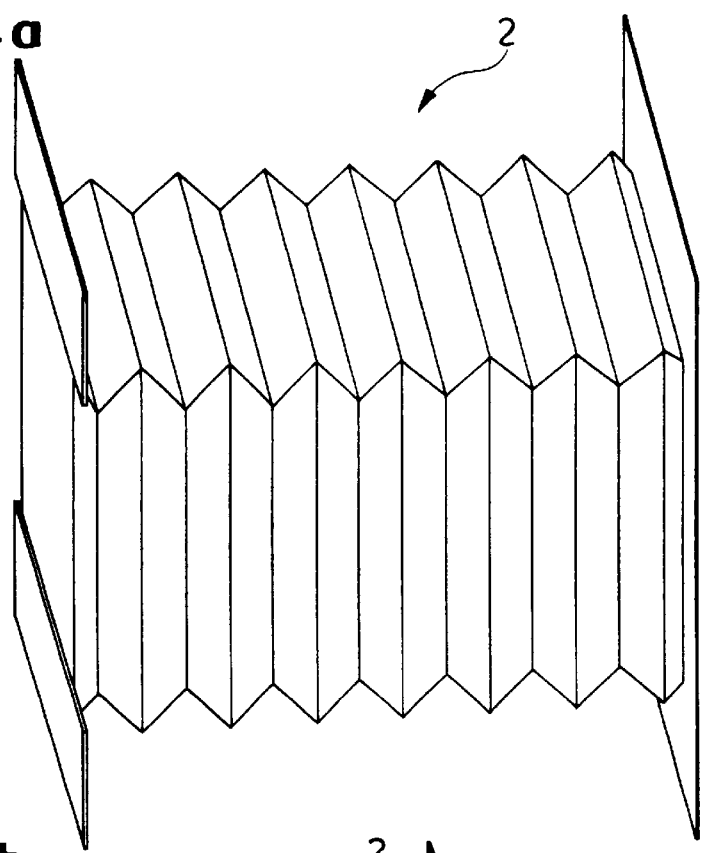
FIG. 4a represents a perspective view of an energy absorbing element according to the present invention prior to sustaining a deforming impact along its longitudinal axis.
Figure 4B:
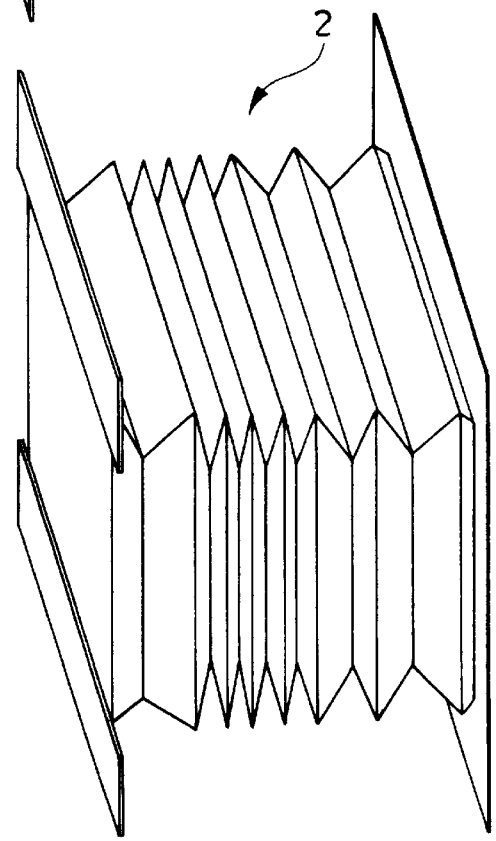
FIG. 4b represents a perspective view of an energy absorbing element according to the present invention after sustaining a deforming impact along its longitudinal axis.
Figure 5:
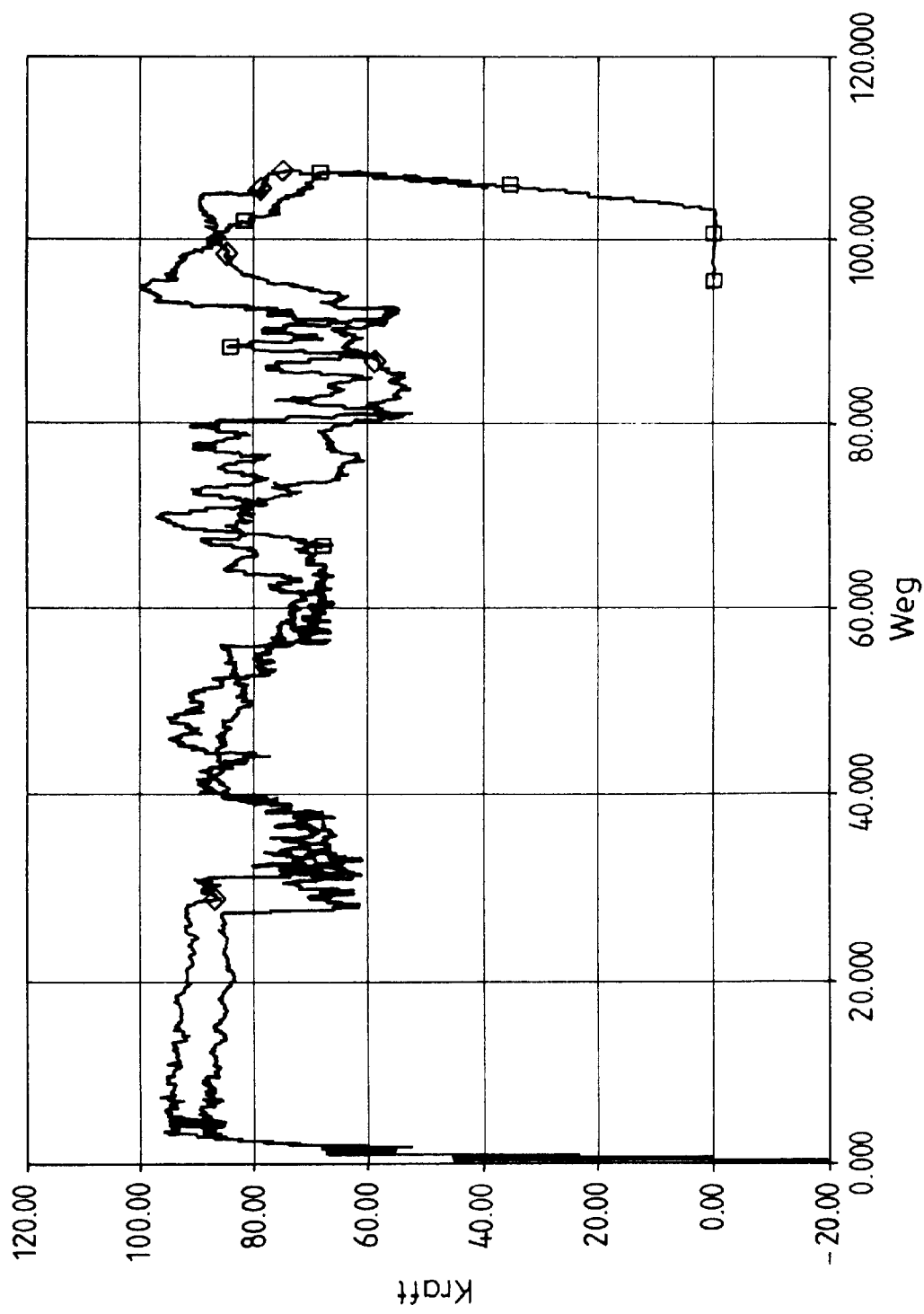
FIG. 5 is a graphical representation of a force-deformation curve obtained from an energy absorbing element according to the present invention.

FIGS. 4a and 4b illustrate the fundamental behavior of an energy absorbing element 2 subjected to a high longitudinal force. The energy absorbing element 2 folds in the manner preset by the undulating structure and absorbs the introduced energy in an almost ideal manner even with a very simple geometry. The associated force-displacement curve is shown in FIG. 5. The force rises to a maximum level within a very short period of time. On further deformation of the energy absorbing element, the force profile on average remains approximately constant. This force-deformation characteristic is very close to that of an ideal energy absorbing element.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An energy absorbing element comprising:
   (a) at least two oppositely arranged metal sheets having a multiplicity of predetermined buckling points which enable each sheet to fold up along its longitudinal direction; and
   (b) a plurality of connecting ribs which interconnect said oppositely arranged metal sheets, said connecting ribs comprising a plastic material selected from at least one of thermoplastic material and thermosetting plastic material.

2. The energy absorbing element of claim 1 wherein said connecting ribs comprise a thermoplastic material selected from at least one of thermoplastic polyamide, thermoplastic polypropylene and thermoplastic polyester.

3. The energy absorbing element of claim 1 wherein said material is reinforced with a reinforcing amount of at least one reinforcing material.

4. The energy absorbing element of claim 1 wherein said ribs are connected to said metal sheets by means of discrete anchoring points, said metal sheets having edges and a plurality of at least one of depressions and apertures having edges, said ribs being formed by injection molding plastic material onto said metal sheets, and said anchoring points being concurrently formed by at least one of,
   (i) the injected-on plastic material passing through at least some of said apertures, and the edges of said apertures being embedded in the plastic material extending therethrough, thereby anchoring said connecting ribs to said metal sheets by means of molded-through features;
   (ii) the injected-on plastic material filling at least some of said depressions, thereby anchoring said connecting ribs to said metal sheets by means of molded nubs; and
   (iii) the injected-on plastic material encasing and embedding at least a portion of the edges of said metal sheets, thereby anchoring said connecting ribs to said metal sheets by means of molded-around features.

5. The energy absorbing element of claim 1 wherein the buckling points are formed by at least one of undulating, trapezoidal and sawtooth profiling of the metal sheets.

6. The energy absorbing element of claim 1 wherein the ribs interconnect opposite buckling points of the oppositely arranged metal sheets.

7. The energy absorbing element of claim 5 wherein the ribs interconnect between at least one of opposite depressions and opposite elevations of the oppositely arranged metal sheets.

8. The energy absorbing element of claim 3 wherein at least some of the ribs have additional flange webs at the discrete anchoring points.

9. The energy absorbing element of claim 1 wherein a base plate is attached at one end of the energy absorbing element.

10. A bumper system for vehicles, comprising at least one energy absorbing element according to claim 1.

11. The bumper system of claim 10 further comprising at least one transverse beam having two ends, at least one of said energy absorbing elements being attached to each of the two ends of said transverse beam.

12. The bumper system of claim 11 wherein the transverse beam is detachably laterally fastened to each energy absorbing element.

13. The bumper system of claim 12 wherein the transverse beam is detachably laterally fastened to each energy absorbing element by means of a flange positioned at each end of said transverse beam and abutting each energy absorbing element, each flange having a plurality of elongated holes through which fasteners pass.

* * * * *